United States Patent
Matsuda et al.

(10) Patent No.: US 6,771,004 B1
(45) Date of Patent: Aug. 3, 2004

(54) ACTUATOR USING DISPLACEMENT ELEMENT

(75) Inventors: Shinya Matsuda, Takarazuka (JP); Takashi Matsuo, Itami (JP); Masayuki Ueyama, Takarazuka (JP)

(73) Assignee: Minolta Co., Ltd., Osaka (JP)

( * ) Notice: Subject to any disclaimer, the term of this patent is extended or adjusted under 35 U.S.C. 154(b) by 53 days.

(21) Appl. No.: 09/697,570

(22) Filed: Oct. 26, 2000

(30) Foreign Application Priority Data

Nov. 2, 1999  (JP) .......................... 11-312965

(51) Int. Cl.⁷ .................... H01L 41/04; H01L 41/06
(52) U.S. Cl. ............. 310/328; 310/323.16; 310/323.02; 310/317; 310/316.01; 310/311
(58) Field of Search ................. 310/328, 317, 310/323.16, 323.02, 316.01, 311, 326.02

(56) References Cited

U.S. PATENT DOCUMENTS

| | | | | |
|---|---|---|---|---|
| 4,249,100 A | * | 2/1981 | Vasiliev et al. ............. 310/317 |
| 4,613,782 A | | 9/1986 | Mori et al. ................. 310/323 |
| 4,678,955 A | * | 7/1987 | Toda ........................ 310/328 |
| 4,811,246 A | * | 3/1989 | Fitzgerald, Jr. et al. ..... 364/550 |
| 4,947,077 A | * | 8/1990 | Murata ...................... 310/328 |
| 4,950,135 A | | 8/1990 | Tojo et al. ................. 417/410 |
| 5,079,471 A | * | 1/1992 | Nygren, Jr. ................. 310/228 |
| 5,132,582 A | | 7/1992 | Hayashi et al. ............. 310/323 |
| 5,424,597 A | | 6/1995 | Glöss et al. ................ 310/328 |
| 5,523,643 A | * | 6/1996 | Fujimura et al. ........... 310/328 |
| 5,563,465 A | | 10/1996 | Nakahara et al. ........... 310/328 |
| 5,616,980 A | | 4/1997 | Zumeris .................... 310/323 |
| 5,696,421 A | * | 12/1997 | Zumeris et al. ............. 310/328 |
| 5,834,879 A | * | 11/1998 | Watanwbe et al. .......... 310/328 |
| 5,900,691 A | | 5/1999 | Reuter et al. ............... 310/348 |
| 5,949,177 A | * | 9/1999 | O'Brien et al. ......... 310/316.01 |
| 6,060,816 A | * | 5/2000 | Audren .................. 310/323.02 |
| 6,066,911 A | | 5/2000 | Lindemann et al. ... 310/323.02 |
| 6,114,799 A | * | 9/2000 | Yoshida et al. ............. 310/328 |
| 6,201,339 B1 | * | 3/2001 | Tani et al. ................. 310/328 |
| 6,201,340 B1 | | 3/2001 | Matsuda et al. ............ 310/328 |
| 6,204,590 B1 | * | 3/2001 | Audren et al. ......... 310/316.01 |
| 6,232,700 B1 | * | 5/2001 | Kosaka et al. ......... 310/323.17 |
| 6,242,850 B1 | * | 6/2001 | Slutskiy et al. ............. 310/328 |
| 6,313,566 B1 | * | 11/2001 | Cunningham et al. ...... 310/328 |
| 6,373,170 B1 | * | 4/2002 | Hills ........................ 310/328 |
| 6,384,515 B1 | * | 5/2002 | Ganor et al. ............... 310/328 |
| 6,448,694 B2 | * | 9/2002 | Matsuo et al. .............. 310/328 |
| 6,603,239 B1 | * | 8/2003 | Michely et al. ............ 310/328 |
| 6,628,044 B2 | * | 9/2003 | Audren et al. ......... 310/323.02 |
| 6,628,045 B2 | * | 9/2003 | Yoon et al. ............ 310/323.04 |

FOREIGN PATENT DOCUMENTS

| | | |
|---|---|---|
| JP | 53-082286 A | 7/1978 |
| JP | 62-058883 A | 3/1987 |
| JP | 05-184172 A | 7/1993 |

OTHER PUBLICATIONS

U.S. patent application Ser. No. 09/583,366, filed May 31, 2000.
U.S. patent application Ser. No. 09/591,622, filed Jun. 9, 2000.

(List continued on next page.)

*Primary Examiner*—Thomas M. Dougherty
*Assistant Examiner*—Pedro J. Cuevas
(74) *Attorney, Agent, or Firm*—Sidley Austin Brown & Wood LLP

(57) ABSTRACT

Piezoelectric elements 10 and 10' are driven so as to satisfy the relationship $$Nt=X0(1/(1/k2+1/k3)-1/(1/k1+1/k2+1/k3))$$

when the drive member, tip 20, and driven member, rotor 40, are in a state of intermittent contact, and in a state near the condition of transition from the intermittent contact state to the normal contact state. When the spring constant of the spring 41 is designated k1, the spring constant of the combined piezoelectric elements 10 and 10' and the tip 20 is designated k2, the spring constant of the rotor 40 is designated k3, the amount of displacement of the piezoelectric elements 10 and 10' is designated X0, and the compression force of the spring 41 is designated Nt.

12 Claims, 14 Drawing Sheets

OTHER PUBLICATIONS

Sogo Denshi Shuppansha Japan, "Admission Into Ultrasonic Motor", Feb. 20, 1991 (4 pages).

Hideaki Oku et al, "First Report of Piezoelectric Traveling Wave Type Linear Actuator", *Collection of Lecture of Precision Engineering Institution*, Spring, 1995 (2 pages).

"Developing of a Small Actuator with Three Degrees of Rotational Freedom (1st Report)" by K. Sasae et al., Journal of Precision Engineering Institution, vol. 61, No. 3, 1995, pp. 386–390.

"Developing of a Small Actuator with Three Degrees of Rotational Freedom (2nd Report)" by K. Sasae et al., Journal of Precision Engineering Institution, vol. 61, No. 4, 1995, pp. 532–536.

"Developing of a Small Actuator with Three Degrees of Rotational Freedom (3rd Report)" by K. Sasae et al., Journal of Precision Engineering Institution, vol. 62, No. 4, 1996, pp. 599–603.

"2. Explanation of a Driving Principle and Configuration of an Ultrasonic Linear Actuator" of "Manufacture and Estimation of Thin Ultrasonic Linear Motor" by S. Nagatome et al., Collection of Lecture of Precision Engineering Institution, in Spring, 1998, p. 544.

\* cited by examiner

Phase Difference: 0°

Phase Difference: 45°

Phase Difference: 90°

Phase Difference: 135°

Phase Difference: 180°

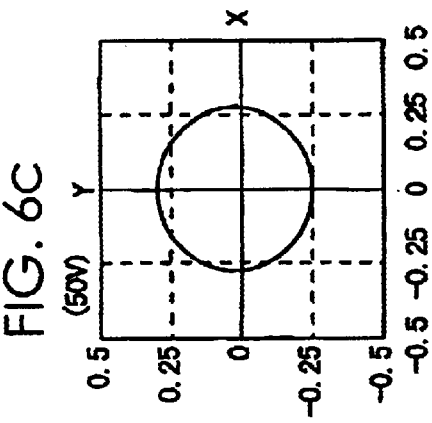
FIG. 6a (30V)
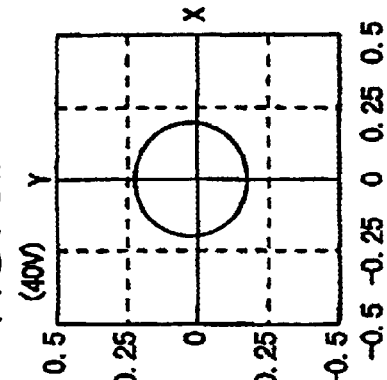
FIG. 6b (40V)
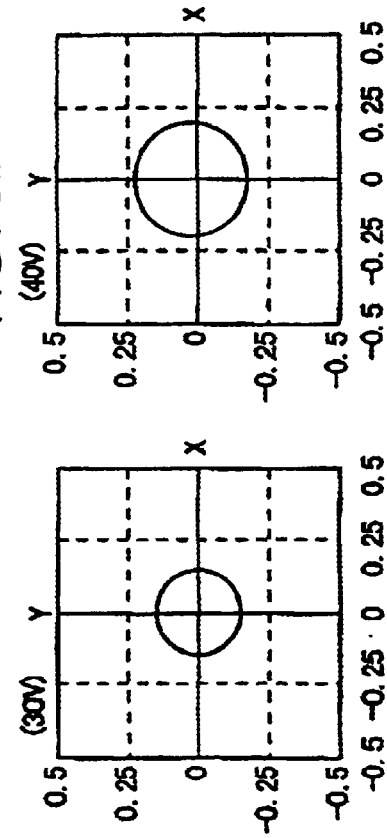
FIG. 6c (50V)
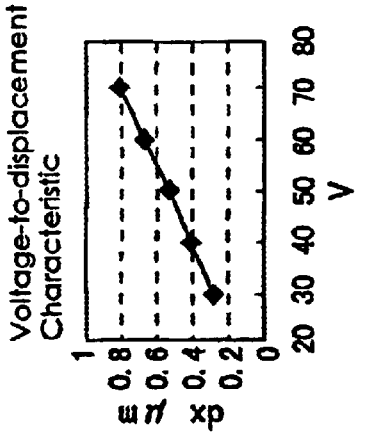
FIG. 6d (60V)
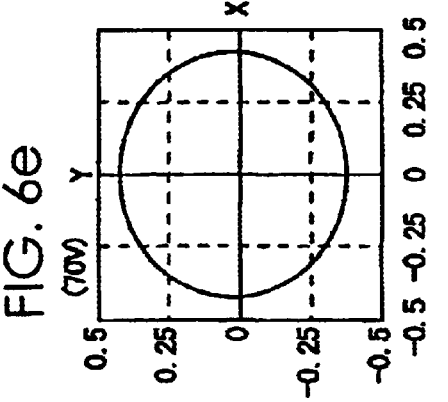
FIG. 6e (70V)
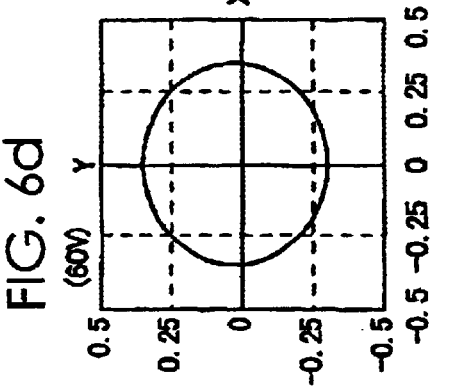
FIG. 6f Voltage-to-displacement Characteristic

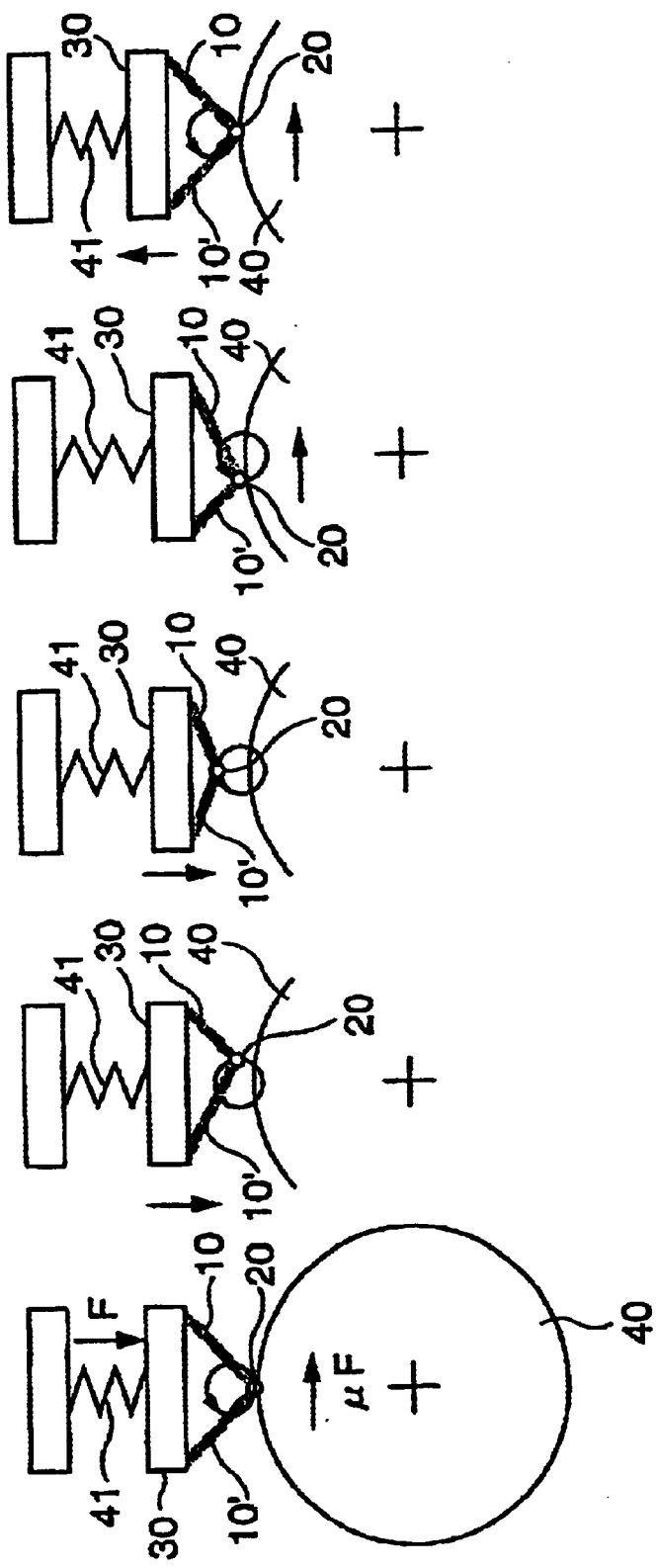

ACTUATOR USING DISPLACEMENT ELEMENT

This application is based on Patent Application No. 11-312965 filed in Japan, the content of which is hereby incorporated by reference.

BACKGROUND OF THE INVENTION

1. Field of the Invention

The present invention relates to an actuator using a displacement element such as a piezoelectric element or the like.

2. Description of the Related Art

In recent years, actuators have been proposed having two displacement elements such as a piezoelectric element or the like are arranged with their displacement directions set at a predetermined angle (e.g., 90°). In this actuator, an alternating current voltage signal having a specific phase difference drives each displacement element such that a drive member provided at the intersection point of the displacement elements moves in an elliptical path. This drive member abuts a driven member, and rotates or moves the driven member in a specific direction. Such an actuator is referred to as a truss-type actuator. The voltage or resulting displacement applied to the first piezoelectric element (displacement element) 10 and the second piezoelectric element (second displacement element) 10' is shown in FIG. 16. When sine wave voltages of different phase, as shown in FIG. 16, are applied to the first piezoelectric element 10 and the second piezoelectric element 10', the first piezoelectric element 10 and the second piezoelectric element 10' are displaced in a sinusoidal wave-like fashion in accordance therewith. As a result, a tip member (drive member) 20 linked to the first piezoelectric element 10 and the second piezoelectric element 10' moves elliptically (including circular movement).

When the frequency of the sine wave voltage applied to the first piezoelectric element 10 and the second piezoelectric element 10' exceeds a predetermined value and the tip member 20 rotates at faster speed, the actuator itself cannot follow the displace the tip member 20 due to the force applied by the spring 41, and the tip member 20 is temporarily separated from the surface of the rotator 40 (intermittent contact). The tip member 20 moves in a direction opposite to a specified direction while the tip member 20 is separated from the surface of the rotor 40, so as to cause the rotor to rotate. This state is shown in FIGS. 17a~17e.

FIGS. 17a and 17e show the first piezoelectric element 10 and second piezoelectric element 10' both extended, with the tip member 20 in contact with the surface of the rotor 40. FIG. 17b shows the first piezoelectric element 10 contracted and the second piezoelectric element 10' extended, with the tip member 20 separated from the surface of the rotor 40. FIG. 17c shows the first piezoelectric element 10 and the second piezoelectric element 10' both contracted, with the tip member 20 separated from the surface of the rotor 40. FIG. 17d shows the first piezoelectric element 10 extended and the second piezoelectric element 10' contracted, with the tip member 20 in contact with the surface of the rotor 40 when the actuator overtakes the movement of the tip member 20. As can be understood from FIGS. 17a~17e, the rotor 40 is rotated by the repeated contact with and separation from the surface of the rotor 40 by the tip member 20.

When the amount of displacement of the first piezoelectric element 10 and the second piezoelectric element 10' is small and the amount of displacement of the tip member (drive member) 20 is less than several micrometers, a normal contact state arises between both the tip member 20 and the rotor 40 due to the elasticity of the materials of the tip member 20 and the rotor 40. In this instance, in essence disadvantages arise since the tip member 20 must separate from the surface of the rotor 40 and return in a specific direction so as to result in a reduction in speed of the movement of the rotor 40 due to the frictional force arising between both members, or the rotor 40 returns in the opposite direction in conjunction with the tip member 20 so as to reduce the output of the actuator. This phenomenon becomes more pronounced as the force exerted by the spring 41 increases.

OBJECTS AND SUMMARY

In view of the aforesaid disadvantages, an object of the present invention is to provide an improved actuator.

A further object of the present invention is to provide an actuator having high drive efficiency by driving at optimum drive conditions even when the amount of displacement of the displacement element is small.

These and other objects are attained by one aspect of the present invention providing an actuator comprising:

a displacement element which produces a specific displacement;

a drive member connected to one end of the displacement element and which transfers the displacement of the displacement element to a driven member;

a stationary member which supports the other end of the displacement element;

a compression member which presses the drive member against the driven member; and a drive circuit for driving the displacement element when the drive member and the driven member are in a state of intermittent contact, and under conditions near the condition of transition from the intermittent contact state to a normal contact state.

In the actuator, when the spring constant of the compression member is designated k1, the combined spring constant of the displacement element and the drive member is designated k2, the spring an constant of the driven member is designated k3, the amount of displacement of the displacement element is designated X0, and the compression force applied by the compression member is designated Nt, it is desirable that the following relationship is satisfied:

$$Nt = X0(1/(1/k2+1/k3)-1/(1/k1+1/k2+1/k3))$$

It is further desirable that the displacement element is driven at a resonance frequency.

BRIEF DESCRIPTION OF THE DRAWINGS

These and other objects and features of the present invention will become apparent from the following description of the preferred embodiments thereof taken in conjunction with the accompanying drawings, in which:

FIG. 6a shows the path of the tip member when the actuator is under no load and a drive voltage of 30 V is applied;

FIG. 6b shows the path of the tip member when the actuator is under no load and a drive voltage of 40 V is applied;

FIG. 6c shows the path of the tip member when the actuator is under no load and a drive voltage of 50 V is applied;

FIG. 6d shows the path of the tip member when the actuator is under no load and a drive voltage of 60 V is applied;

FIG. 6e shows the path of the tip member when the actuator is under no load and a drive voltage of 70 V is applied;

FIG. 6f shows the relationship between the drive voltage and the diameter (displacement amount) of the path of the tip member;

FIGS. 17a, 17b, 17c, 17d, 17e illustrate the principle of rotating the rotor by an actuator.

In the following description, like parts are designated by like reference numbers throughout the several drawings.

DETAILED DESCRIPTION OF THE PREFERRED EMBODIMENTS

Figure 1:
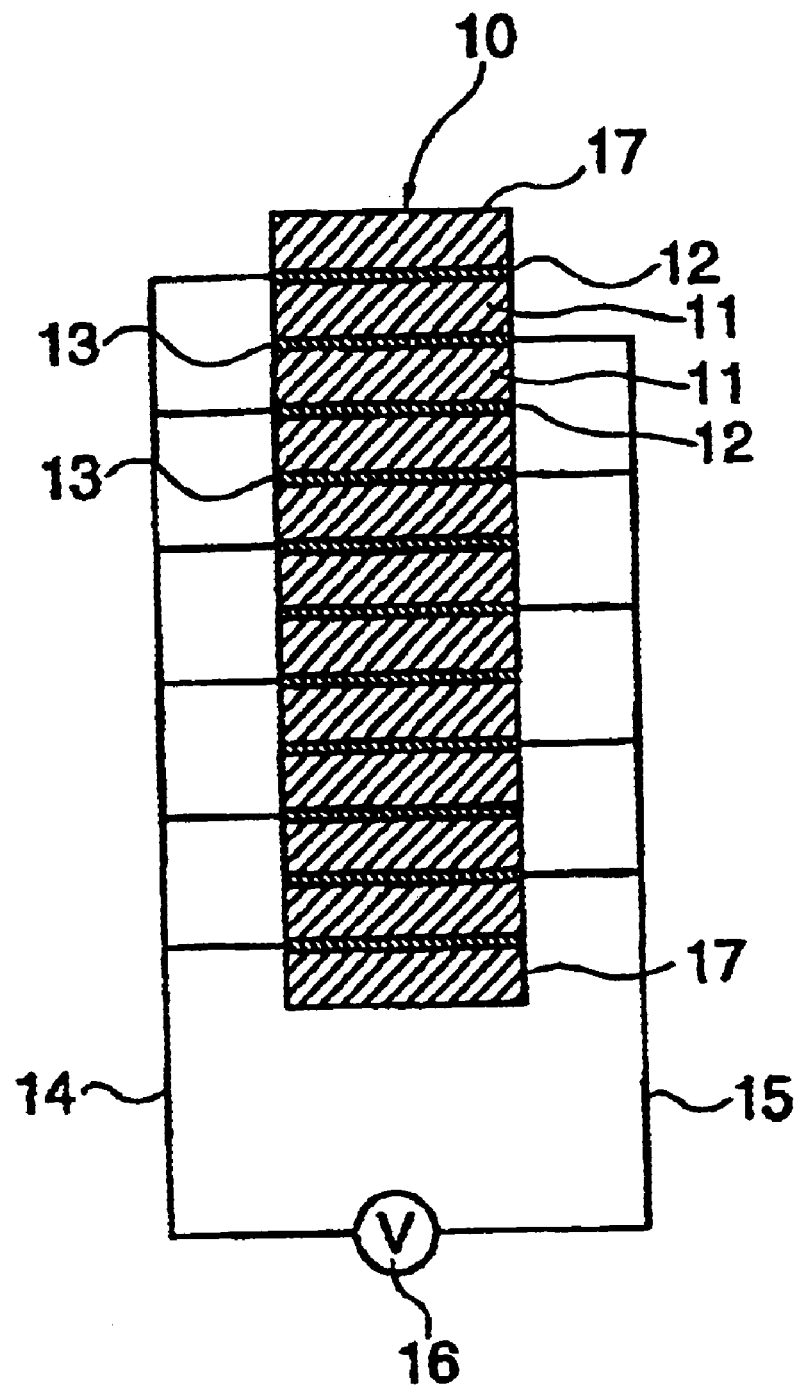
FIG. 1 shows the structure of a laminate-type piezoelectric element.

An embodiment of the actuator of the present invention is described hereinafter. First, FIG. 1 shows the structure of a laminate-type piezoelectric element used as a displacement element of an actuator. As shown in FIG. 1, the laminate-type piezoelectric element 10 comprises alternating layers of a plurality of ceramic thin plates 11 having the voltage characteristics of PZT or the like, and electrodes 12 and 13, each ceramic thin plate 11 and electrode 12 and 13 being fixedly attached by adhesive or the like. The electrodes 12 and 13 arranged in every second layer are respectively connected to a drive power source 16 through signal lines 14 and 15. When a specific voltage is applied between signal lines 14 and 15, an electric field is generated in the laminate layer direction in each ceramic thin plate 11 interposed between the electrodes 12 and 13, and every second electric field is in the same direction. Accordingly, each ceramic thin plate 11 is laminated such that the polarization direction of every second thin plates 11 are identical (i.e., the polarization direction of two adjacent ceramic thin plates 11 are opposite). A protective layer 17 is provided at the bilateral ends of the laminate-type piezoelectric element 10.

Figure 2:
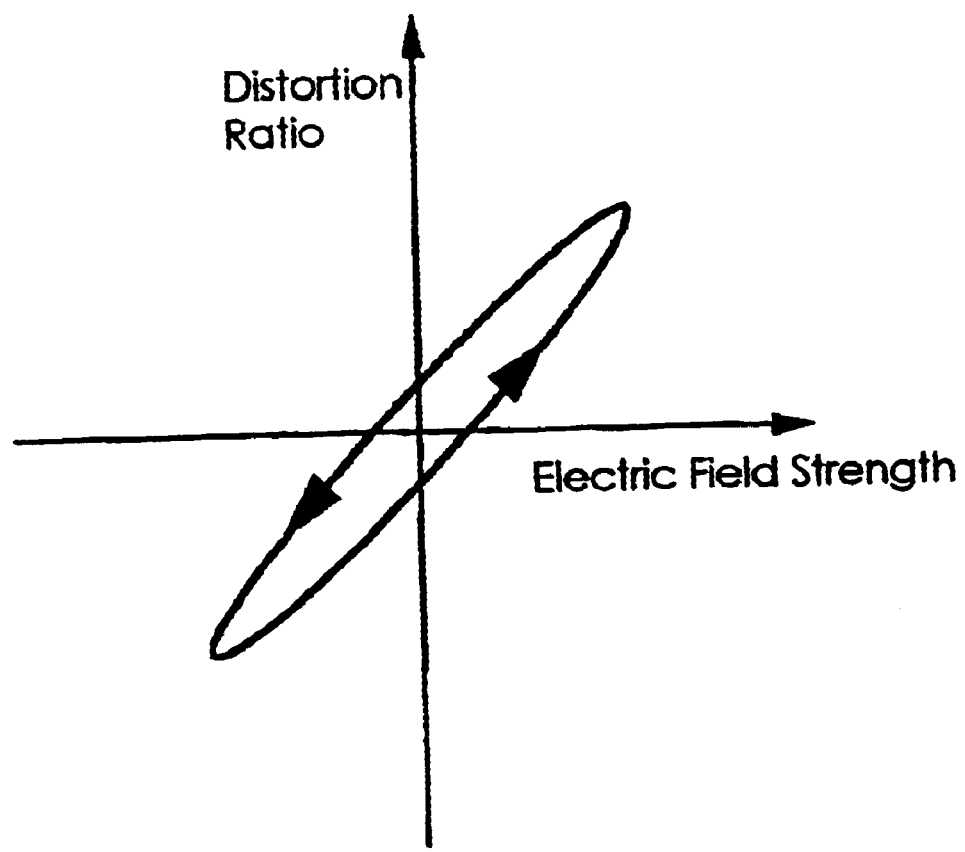
FIG. 2 illustrates the relationship between the displacement (amount of distortion) of the piezoelectric element and the strength of the electric field generated between each electrode in the laminate-type piezoelectric element.

When a direct current drive voltage from the drive power source 16 is applied between the electrodes 12 and 13, all ceramic thin plates 11 extend or contract in the same direction, so as to extend or contract the entire piezoelectric element 10. When the electric field is small, the displacement of the piezoelectric element 10 and the electric field generated between the electrodes 12 and 13 can be viewed as a nearly linear relationship in the region wherein displacement hysteresis can be ignored. This condition is shown in FIG. 2. In the drawing, the horizontal axis represents the electric field strength, and the vertical axis represents the distortion ratio.

When an alternating current drive voltage (AC signal) from the drive power source 16 is applied between the electrodes 12 and 13, the ceramic thin plates 11 repeatedly extend and contract in the same direction in accordance with the electric field, such that the entire piezoelectric element 10 repeatedly extends and contracts. The piezoelectric element 10 has an intrinsic resonance frequency determined by the electrical characteristics and structure of the piezoelectric element. When the frequency of the alternating current driver voltage and the resonance frequency of the piezoelectric element 10 match, impedance is reduced, and the displacement of the piezoelectric element 10 is increased. The piezoelectric element 10 desirably uses this resonance phenomenon to drive at low voltage for small displacement relative to the external dimensions of the piezoelectric element 10.

Figure 3:
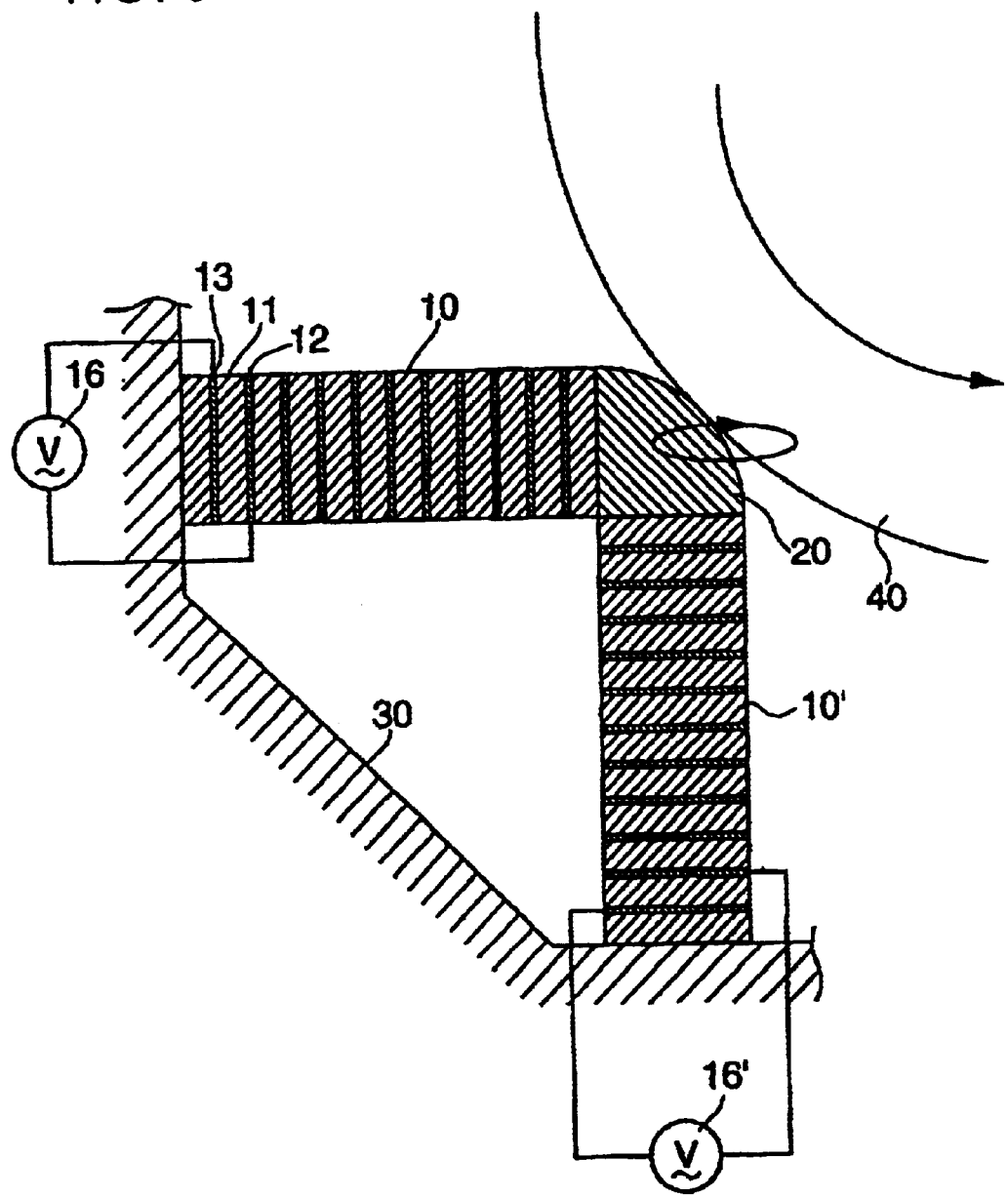
FIG. 3 shows the structure of a truss-type actuator using a laminate-type piezoelectric element.

The structure of the truss-type actuator (hereinafter, referred to simply as "actuator") of the present embodiment is shown in FIG. 3. As shown in FIG. 3, the two displacement elements (laminate-type first piezoelectric element and second piezoelectric element) 10 and 10' are arranged so as to intersect at an approximate right angle, and a tip member 20 is cemented with adhesive to the ends on the intersection side. On the other hand, the other ends of the first and second piezoelectric elements 10 and 10' are cemented with adhesive to a base 30. The tip member 20 is desirably formed of tungsten or the like having excellent wear resistance so as to a obtain stable and high friction coefficient. The base 30 is desirably formed of stainless steel or the like having excellent strength and easily manufactured. The adhesive is desirably an epoxy resin or the like having excellent strength and adhesion. The first piezoelectric element 10 and the second piezoelectric element 10' are essentially identical to the piezoelectric element 10 shown in FIG. 1, and the various structural elements of the second piezoelectric element 10' are differentiated by appending the symbol (') thereto.

The tip 20 performs an elliptic movement by driving the first and second piezoelectric element 10 and 10' with alternating current signals having a phase difference. When the tip 20, for example, is pressed against the exterior surface of a rotor 40 which is rotatable about a specific axis, the elliptic movement (including circular movement) of the tip 20 can be converted to a rotational movement of the rotor 40. Furthermore, the elliptic movement of the tip 20 can be converted to linear movement of a rod-like member, for example, by the tip 20 pressing against the flat surface of the end of a rod (not illustrated). The material of the rotor 40 is desirably a light-weight metal such as aluminum or the like, and the surface of the rotor 40 is desirably subjected to processing such as aluminum anodizing process or the like to prevent wear caused by friction with the tip 20.

Figure 4:
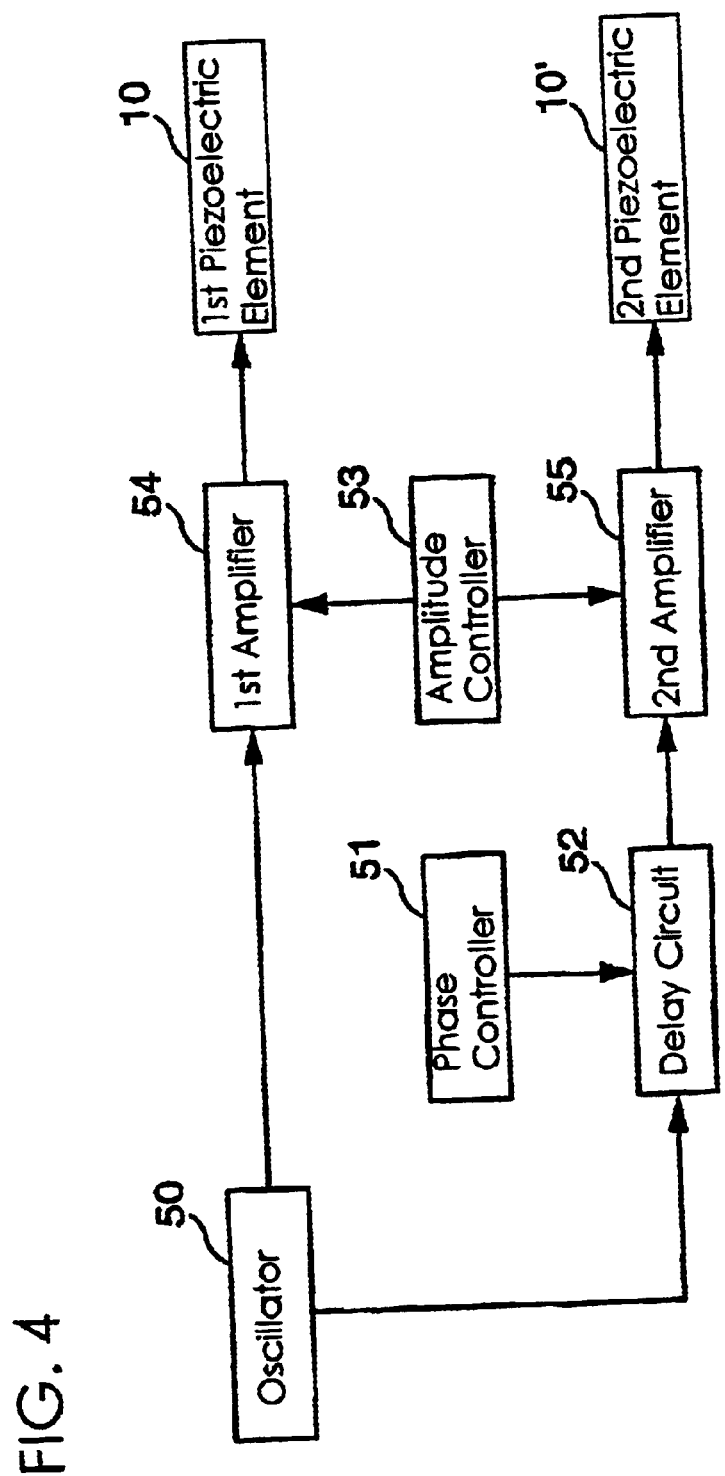
FIG. 4 shows the block structure of the drive circuit.
Figure 5A:
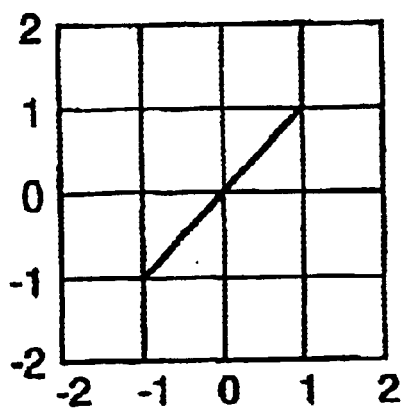
FIG. 5a shows the path of the drive member of the actuator when the amplitudes of the drive signals applied to two piezoelectric elements are equal and the phase difference is 0 degrees.
Figure 5B:
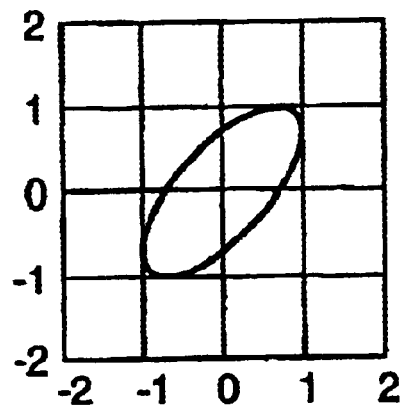
FIG. 5b shows the path of the drive member of the actuator when the amplitudes of the drive signals applied to two piezoelectric elements are equal and the phase difference is 45 degrees.
Figure 5C:
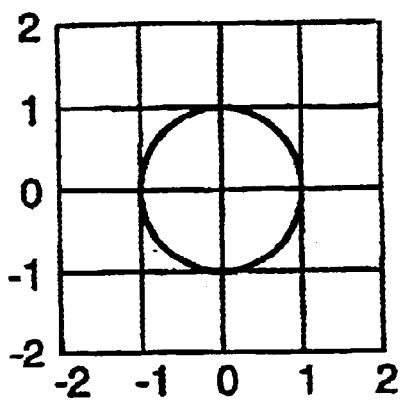
FIG. 5c shows the path of the drive member of the actuator when the amplitudes of the drive signals applied to two piezoelectric elements are equal and the phase difference is 90 degrees.
Figure 5D:
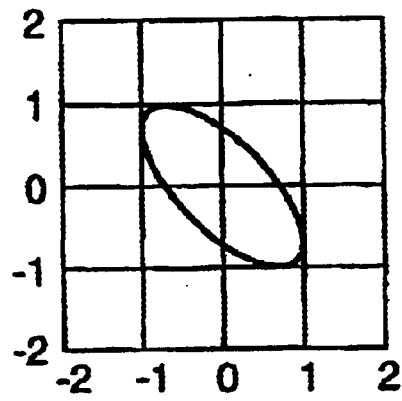
FIG. 5d shows the path of the drive member of the actuator when the amplitudes of the drive signals applied to two piezoelectric elements are equal and the phase difference is 135 degrees.
Figure 5E:
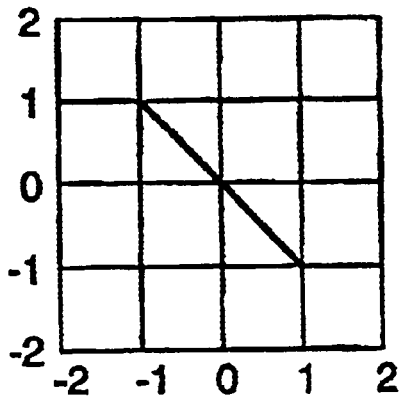
FIG. 5e shows the path of the drive member of the actuator when the amplitudes of the drive signals applied to two piezoelectric elements are equal and the phase difference is 180 degrees.

The block structure of the drive circuit is shown in FIG. 4. An oscillator 50 generates (oscillates) sine wave signals at a resonance frequency matching the same phase mode and the opposite phase mode, as previously described. A phase controller 51 controls a delay circuit 52 in accordance with the rotation speed, drive torque, and rotation direction of the rotor 40, i.e., the driven member, so as to generate a sine wave signal of shifted phase. An amplitude controller 53 controls a first amplifier 54 and a second amplifier 55 so as to amplify the amplitude of the two sine wave signals having mutually shifted phases. The sine wave signals amplified by the first amplifier 54 and the second amplifier 55 are respectively applied to the first piezoelectric element 10 and the second piezoelectric element 10'.

The drive signals for driving the first piezoelectric element 10 and the second piezoelectric element 10' are described below. When the two intersecting and independent movements are combined, the intersection point describes a path in accordance with a system of elliptic movement (Lissajous system). In the actuator of the present embodiment, various paths may be described by changing the amplitude (voltage) and phase difference of the drive signal used to drive the first piezoelectric element 10 and the second piezoelectric element 10'. FIGS. 5a~5e show the paths when the amplitude of the of each drive signal is equalized, and the phase difference between each drive signal is 0°, 45°, 90°, 135°, and 180°.

In this way the rotation direction, rotation speed, and rotation force (torque) of the rotor 40 and the like can be controlled by controlling the path of the tip 20. Specifically, if the diameter of the path of the tip 20 is enlarged in a tangent direction relative to the rotor 40, the rotation speed of the rotor 40 increases. Furthermore, if the diameter of the path of the tip 20 is enlarged in a normal line direction relative to the rotor 40, the rotation force of the rotor 40 is increased. If the phase is inverted, the rotation direction can be reversed.

A prototype of the actuator shown in FIG. 3 was actually produced, and tested to determine optimum drive conditions. First, FIGS. 6a~6e show the paths of the tip when the actuator is driven at different voltages with the actuator in a non-load condition (tip 20 and rotor 40 not in contact). The relationship between the voltage of the drive signal applied to the piezoelectric elements 10 and 10' and the diameter (amount of displacement) of the path of the tip 20 is shown in FIG. 6f. The relationship between force applied by the spring 41 and the contact interval of the tip 20 and the rotor 40 is shown in FIG. 7.

FIG. 6a shows the path when a drive signal of amplitude (voltage) 30 V is applied to piezoelectric elements 10 and 10'; FIG. 6b shows the path at 40 V; FIG. 6c shows the path at 50 V; FIG. 6d shows the path at 60 V; FIG. 6e shows the path at 70 V. FIG. 6f shows the voltage-to-displacement characteristics (i.e., amount of displacement dX in the X direction). As can be understood from the drawings, in the range of drive signal voltages 30 V to 70 V, the voltage of the drive signal of the piezoelectric elements 10 and 10' and the amount of displacement of the tip 20 are near proportional.

Figure 7:
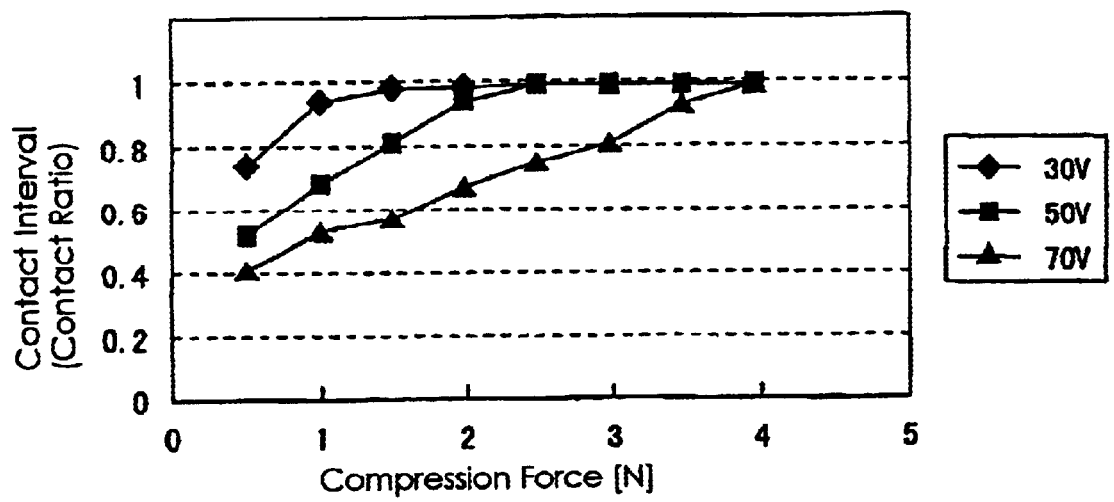
FIG. 7 shows the relationship between the compression force applied by the spring of the actuator, and the contact interval between the tip member and the rotor.

In FIG. 7, the vertical axis represents the contact ratio which is a ratio of the contact interval, during which the tip 20 is in contact with the rotor 40, to the entire time period, and the horizontal axis represents the compression force of the spring 41. When the voltage (drive signal amplitude) is 70 V, the contact interval between the tip 20 and the rotor 40 is near proportional to the compression force of the spring 41. When the voltage is 70 V, the amount of displacement of the piezoelectric elements 10 and 10' becomes large, and the speed of the tip 20 increases due to the elastic deformation speed (recovery speed) of the rotor 40 and tip 20 through the reaction force of the pressure applied by the spring 41, such that the tip 20 is completely separated from the rotor 40. As the compression force applied by the spring 41 increases, the recovery speed of the tip 20 and rotor 40 increases, and the time during which the tip 20 is separated from the rotor 40 becomes shorter.

In contrast, when the voltage is 50 V and 30 V, the amount of displacement of the piezoelectric elements 10 and 10' is small, and the recovery speed of the tip 20 and the rotor 40 becomes faster via the reaction force to the compression force applied by the spring 41, such that the tip 20 and the rotor 40 are in a state of normal contact. Comparing the two voltages, when the voltage is 30 V, there is less displacement of the piezoelectric elements 10 and 10', and the range of normal contact interval of the tip 20 and the rotor 40 is wider since the speed of the tip 20 is slower. For example, in the case of a voltage of 50 V, the transition point of the intermittent contact state and the normal contact state of the tip 20 and the rotor 40 is near the a compression force of 2.5 N.

Figure 8:
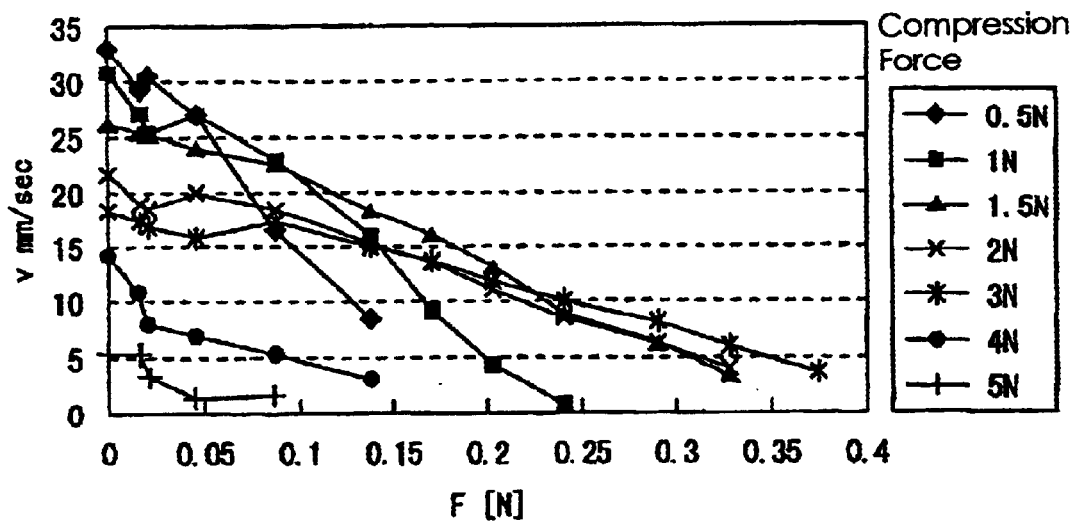
FIG. 8 shows the relationship between the speed (rotation) and load on the rotor in the actuator.

Then, the voltage of the drive signals of the piezoelectric elements 10 and 10' were set at 50 V and a frequency of 25 kHz, and the load-to-(rotation) speed characteristics of the rotor 40 were measured while changing the compression force of the spring 41 between 0.5 N to 5 N. The measurement results are shown in FIG. 8. The output characteristics (load-to-drive efficiency characteristics) of the actuator under identical conditions is shown in FIG. 9.

First, we focus on the vertical axis (when the load is zero) in FIG. 8. In a non-load state, the speed V is decreased in accordance with an increase in the compression force of the spring 41 from 0.5 N to 5 N. However, in the state of intermittent contact between the tip 20 and the rotor 40, i.e., when the compression force of the spring 41 has the characteristics curve of 0.5 N, 1 N, 1.5 N, and 2 N, the friction force increases between the tip 20 and the rotor 40 in accordance with the increase in compression force by the spring 41, and the starting force (acceleration) of the actuator increases. As can be understood from FIG. 7, the time of contact between the tip 20 and the rotor 40 increases in accordance with the increase in the compression force of the spring 41. Although there is deceleration during the contact between the tip 20 and the rotor 40, the influence of the increase in the starting speed is greater than the influence of this deceleration. As a result, the output of the actuator increases.

On the other hand, in the state of normal contact between the tip 20 and the rotor 40, i.e., when the compression force of the spring 41 has the characteristics curve of 3 N, 4 N, and 5 N, the friction force increases between the tip 20 and the rotor 40 in accordance with the increase in the compression force of the spring 41, such that there is increased acceleration of the actuator, however, there is also a simultaneous increase in deceleration. Since the voltage of the drive signal is fixed at, for example, 50 V, the amplitude of the displacement of the piezoelectric elements 10 and 10' is constant, and the difference between the deceleration force (equivalent to torque) is early constant. However, as a result the actuator is reduced due to a reduction in speed when the compression by the spring 41 increases.

Figure 9:
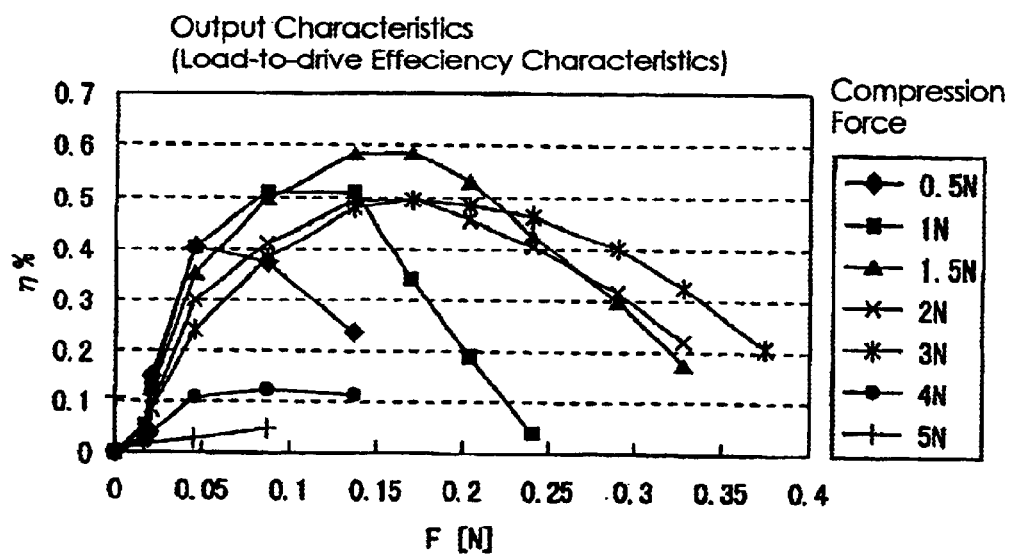
FIG. 9 shows the actuator output characteristics (load-to-drive efficiency characteristics)
Figure 10:
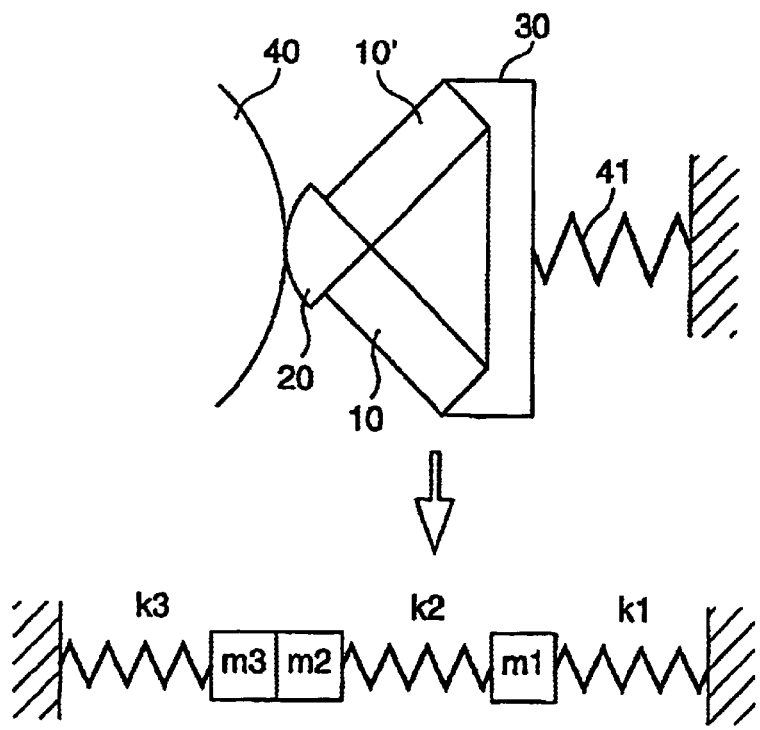
FIG. 10 shows the elastic contact model generating elastic deformation in the contact area of the tip member and the rotor in the actuator.

Considering the aforesaid conditions in FIG. 8 and focusing on the characteristics curve of a compression force of 2 N and 3 N in FIG. 9, it can be understood that the optimum actuator drive efficiency occurs when the transition point of a state of intermittent contact between the tip 20 and the rotor 40 and the normal contact state is in the vicinity of a compression force of 2.5 N. In the case of this actuator, the condition of maximum drive efficiency $\eta$ is simultaneously the condition of maximum actuator output since the electrical input is constant.

Next, the test results were analyzed using an elastic contact model producing elastic deformity in the contact area of the tip 20 and consider a spring having the collective mass of the piezoelectric elements 10 and 10' and the tip 20 and rotor 40. The mass of the piezoelectric elements 10 and 10', and the mass of the tip 20 are added. One end of the rotor 40 and the base 30 are fixed, and one end of the piezoelectric elements 10 and 10' are fixed to the base 30. The spring constant of the spring 41 is designated k1, the mass of the base 30 is designated m1, the spring constant and mass of the combined piezoelectric elements 10, 10' and tip 20 are designated k2 and m2, and the spring constant and mass of the rotor 40 are designated k3 and m3.

Figure 11:
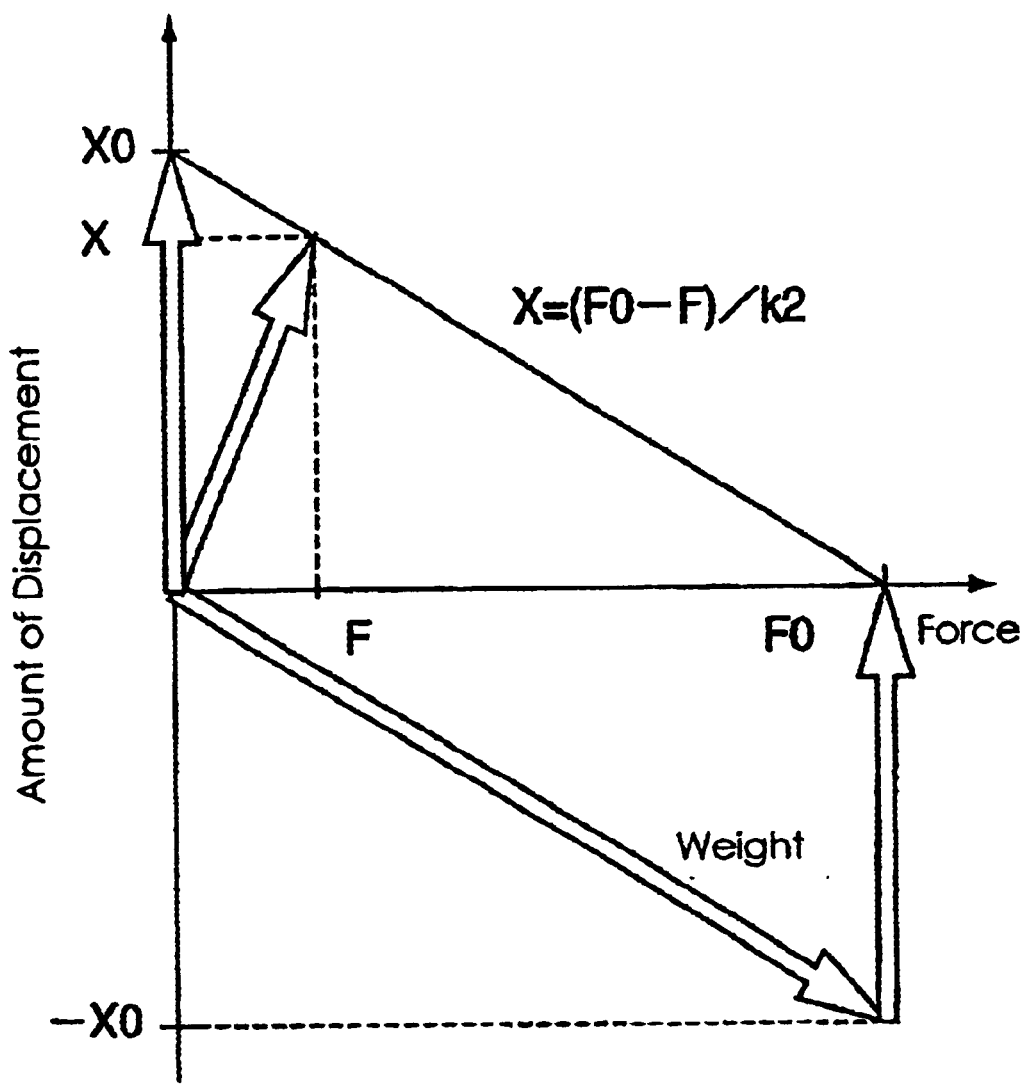
FIG. 11 shows the relationship between the displacement of the piezoelectric element and the drive force generated thereby in the elastic contact model.

The relationship between the displacement of the piezoelectric elements 10 and 10' and the drive force generated by such displacement is shown in FIG. 11. In the drawing, the vertical axis represents the amount of displacement X of the piezoelectric elements 10 and 10', and the horizontal axis represents the force F generated by the piezoelectric elements. Since the piezoelectric elements 10 and 10' are displaced only an amount X0 when a voltage V0 is applied to the piezoelectric elements 10 and 10', a force F0=k2·X0 is generated at the ends of the piezoelectric elements 10 and 10'. Conversely, in the state wherein a voltage is not applied to the piezoelectric elements 10 and 10', the weight W at that end of the element is such that weight W=F0, and the piezoelectric elements 10 and 10' are displaced only —X0 (contracts only X0). Now assume a spring having a spring constant K is mounted in a state of free length to the piezoelectric elements 10 and 10'. When the amount of displacement when a voltage Vo is applied to the piezoelectric elements 10 and 10' is designated X, and the reaction force from the spring is designated F, the relationships F0=(K+k2)·X, and F=K·X are obtained. When the value K is removed from these equations, the relationship X=(F0−F) is obtained.

Figure 12A:
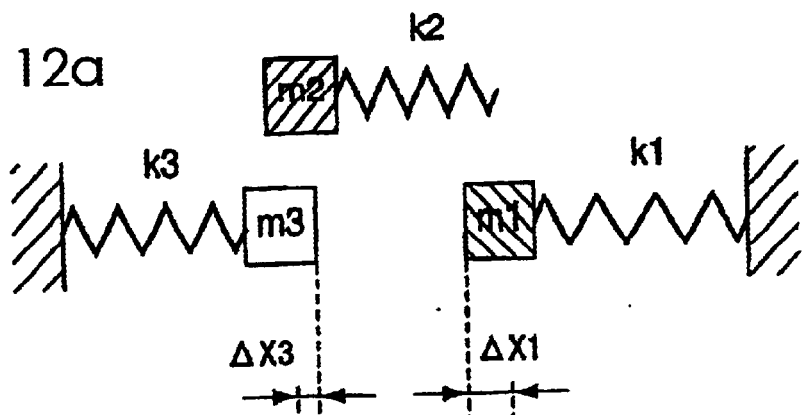
FIGS. 12a, 12b, 12c, 12d show the deportment when the piezoelectric element extends and contracts in the elastic contact model.
Figure 12B:
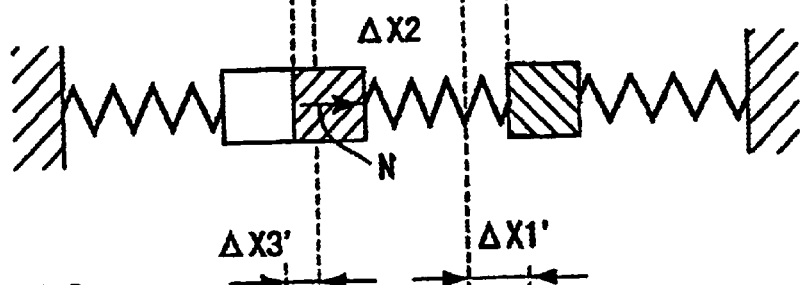

The operation when the piezoelectric elements 10 and 10' extend and contract is analyzed below. FIG. 12a shows the state before integration of the piezoelectric elements 10 and 10'; FIG. 12b shows the initial state of the integrated piezoelectric elements 10 and 10'. A pressing force N acts in the system without the application of a voltage to the piezoelectric elements 10 and 10'. Each element contracts in accordance with the spring constant, and the piezoelectric elements 10 and 10' have the same weighted state at one end.

Figure 12C:
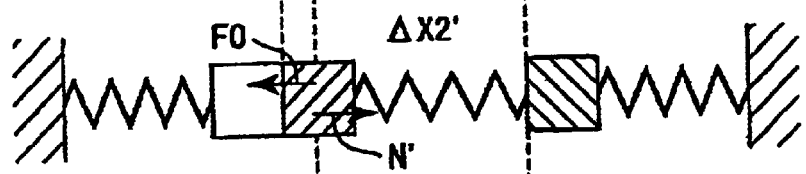

FIG. 12c shows the displacement of the piezoelectric elements 10 and 10' when the voltage applied to the piezoelectric elements 10 and 10' is gradually increased. The spring 41 and rotor 40 (spring component) contract and the compression increases in accordance with the extension of the piezoelectric elements 10 and 10'. The piezoelectric elements 10 and 10' are identical in that a spring having a spring constant K=K1,K3/(K1+k3) is mounted on one end of the piezoelectric elements 10 and 10'.

Figure 12D:
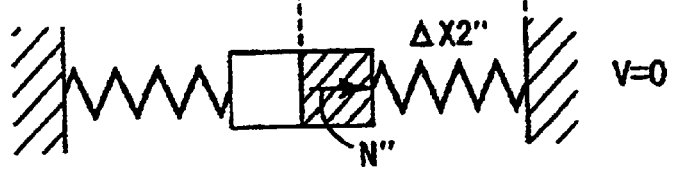
Figure 13:
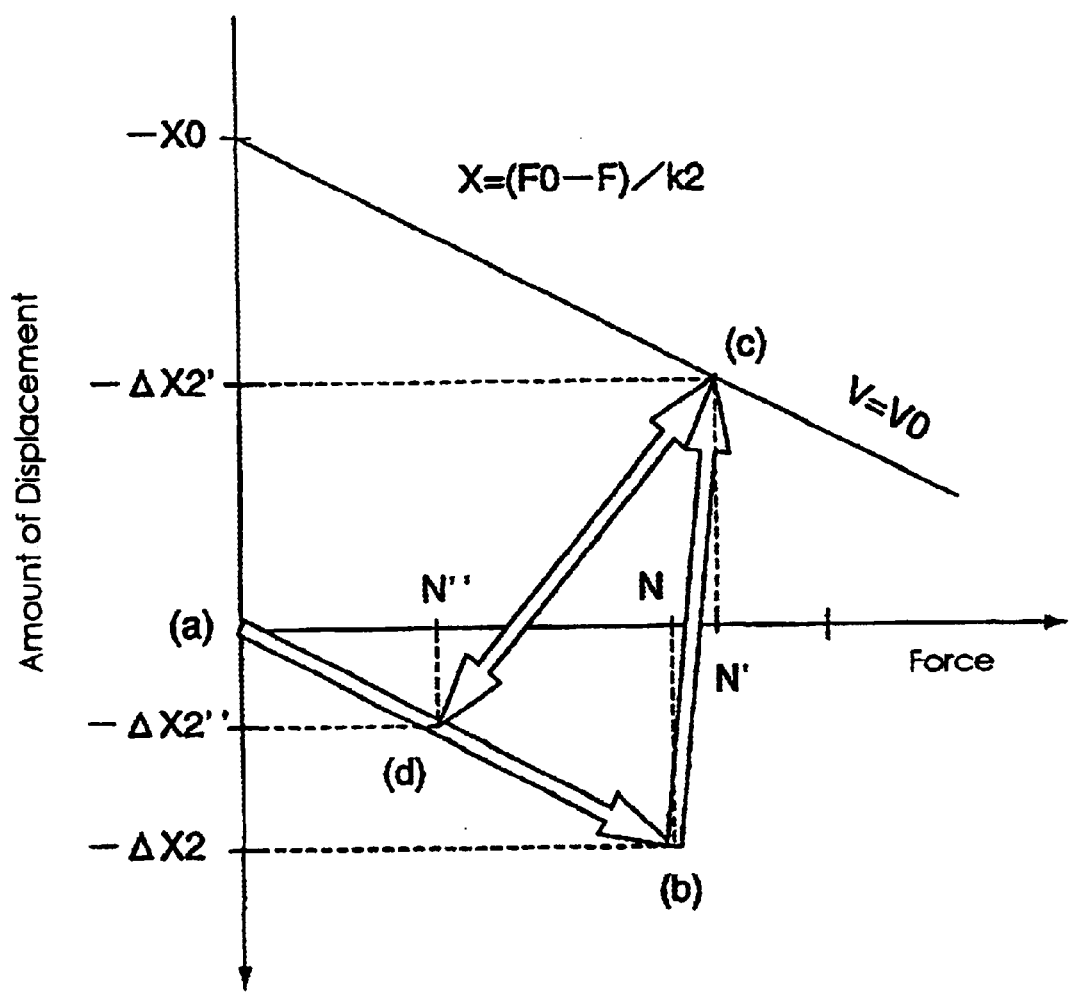
FIG. 13 shows the relationship between the displacement of the piezoelectric element and the compression force in each state in the elastic contact model.

FIG. 12d shows the state resulting from a rapid reduction or reversal of the voltage applied to the piezoelectric elements 10 and 10', and the rapid contraction of the piezoelectric elements. In this case, the rotor 40 follows the rapid displacement of the piezoelectric elements 10 and 10', but the base 30 and the spring 41 cannot follow, and only the base 30 is not displaced. Accordingly, in FIG. 12d, the base 30 is at rest as a wall.

When the piezoelectric elements 10 and 10' contract, the spring component of the rotor 40 is extended in conjunction with the contraction of the piezoelectric elements, and the compression force pressing between the rotor 40 and the piezoelectric elements 10 and 10' is reduced. In this case, the spring opposing the piezoelectric elements 10 and 10' is only the spring component (spring constant k3) of the rotor 40, and the spring constant is greater than when the piezoelectric elements 10 and 10' are extended as shown in FIG. 12c (k3>K). Accordingly, when the piezoelectric elements 10 and 10' contract as shown in FIG. 12d, the slope of the displacement-to-generated force characteristics are smaller than when the piezoelectric elements 10 and 10' are extended as shown in FIG. 12c. As a result, the path of the tip 20 provided at the intersection of the two piezoelectric elements 10 and 10' shifts from circular to elliptic.

The relationship of each constant is determined using FIGS. 12a–12d. The compression force in FIGS. 12b, 12c, 12d are designated N, N', N"; the displacement of each element is designated $\Delta Xn$, $\Delta Xn'$, $\Delta Xn''$ (where n=1~3). Since the total length of the system is unchanged in these states, the following relationship is obtained.

$$\Delta X1 + \Delta X2 + \Delta X3 = \Delta X1' - \Delta X2' + \Delta X3' = +\Delta X2'' + \Delta X3'' \quad (1)$$

The following are derived from Hooke's Law.

$$N = \Delta X1 \times k1 = \Delta X2 \times k2 = \Delta X3 \times k3$$

$$N' = \Delta X1' \times k1 = (X0 - \Delta X2') \times k2 = \Delta X3' \times k3$$

$$N'' = \Delta X2'' \times k2 = \Delta X3'' \times k3$$

When N, N', N" are substituted in the left side of the equality of equation (1), the following is obtained.

$$N(1/k1 + 1/k2 + 1/k3) = N'(1/k1 + 1/k2 + 1/k3) - X0$$

$$N - N' = X0/(1/k1 + 1/k2 + 1/k3) \quad (2)$$

Similarly, when N, N', N" are substituted in the right side of equation (1), the following is obtained.

$$N'(1/k1+1/k2+1/k3)-X0=N'/k1+N''(1/k2+1/k3)$$

$$N'-N''=X0/(1/k2+1/k3) \quad (3)$$

When N' is eliminated from equations (2) and (3), the following is obtained.
ti $N-N'=X0(11(1/k2+1/k3)-1/(1/k1+1/k2+1/k3))$ When the critical compression force of the spring 41 at the time of transition from the intermittent contact state to the normal contact state between the tip 20 and the rotor 40 is designated Nt, since N"=0, the following is obtained.

$$Nt=X0(1/(1/k2+1/k3)-1/(1/k1+1/k2+1/k3)) \quad (4)$$

On the other hand, the amplitude Nw of the compression applied to the rotor 40 is normally constant in the normal contact state between the tip 20 and the rotor 40, such that from equation (3) the following is obtained.

$$Nw=N'-N''-X0/(1/k2+1/k3) \quad (5)$$

At this time the displacement Xt of the piezoelectric elements 10 and 10' is also constant, and that value is expressed below.

$$Xt=\Delta X2'+\Delta X2''=X0-N'/k2+N''/k2=X0 \; k2/(k2+k3) \quad (6)$$

In order to increase the output of a truss-type actuator such as the present embodiment, the force in the tangent direction of the rotor 40 transmitted to the rotor 40 from the tip 20, i.e., the difference in the acceleration force and deceleration force, may be increased. This force in the tangent direction is expressed as the product of the friction coefficient $\mu$ acting between the tip 20 and the rotor 40, and the amplitude Nw of the compression force. Various methods of increasing the friction coefficient $\mu$ have been proposed heretofore, and description of these methods are omitted. However, As can be understood from equation (5), increasing the amplitude Nw of the compression force can be achieved by increasing the displacement X0 of the tip 20 or the piezoelectric elements 10 and 10', or increasing the spring constant k2 of the piezoelectric elements 10 and 10' or the spring constant k2 of the spring component of the rotor 40.

The method of increasing the displacement X0 includes methods of simply increasing the amplitude (voltage) of the drive signal applied to the piezoelectric elements q0 and 10', and methods which use the resonance phenomenon to drive the piezoelectric elements 10 and 10' at their respective resonance frequency. In the case of the former method, the drive efficiency is not changed because the energy required to drive the piezoelectric element also increases. In the case of the latter method, the drive efficiency is effectively improved because a large displacement is obtained using little energy.

The combined spring constant k2 of the tip 20 and the piezoelectric elements 10 and 10', and the spring constant k3 of the rotor 40 are determined by the characteristics and shape of the respective members. When the cross section of the piezoelectric elements 10 and 10' and the rotor 40 is designated S, the elasticity of the material of these members is designated E, and their length is designated L, the spring constant k is expressed as k=S·E/L. Accordingly, the spring constants k2 and k3 can be increased by increasing the cross sections S and reducing the length L of the piezoelectric elements 10 and 10', tip 20, and rotor 40, and the elasticity E of the material of these members, with the result that the output of the actuator can be increased.

Since the spring constant k3 of the rotor 40 changes depending on the surface roughness and hardness of the contact surface of the tip 20, the contact surfaces may be made smooth by polishing the surfaces of the tip 20 and rotor 40, and increasing the hardness of the surface by a nitriding process or oxidation process.

Figure 14:
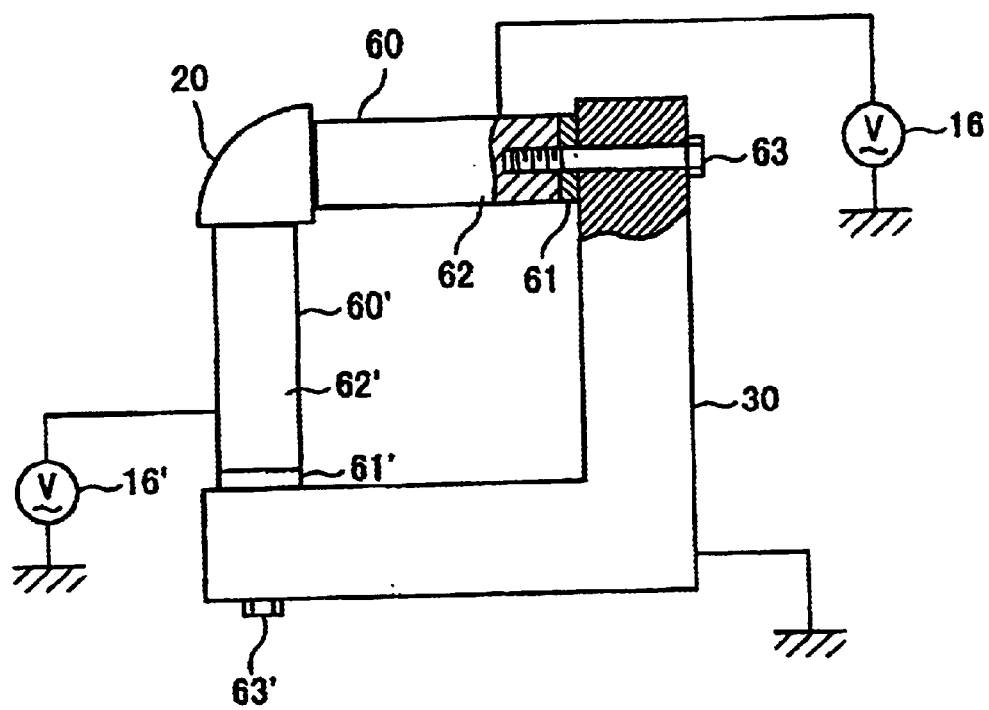
FIG. 14 shows the structure of another embodiment of a truss-type actuator.

Although a piezoelectric element is used as the displacement element in the present embodiment, piezoelectric elements generally are made of ceramic material which increase the attenuation of the oscillation compared to metal material, and have a small displacement expansion ratio during resonance. Although ceramic is strong relative to compression force, it is weak relative to tension force, and there is a possibility of peeling at the cemented surface particularly in the case of laminate-type piezoelectric elements. An element formed by a single layer piezoelectric element and a metal elastic body connected in series may be used as the displacement element. The structure of a truss-type actuator using such a displacement element is shown in FIG. 14.

A first displacement element 60 and second displacement element 60' respectively comprise a single layer piezoelectric element (ceramic thin plate) 61 and 61', an elastic body 62, 62', and electrodes are not provided on both surfaces of the piezoelectric elements 61 and 61'. The first displacement element 60 and the second displacement element 60' are attached to the tip 20 and base 30 by bolts 63 and 63' without using adhesive. The elastic bodies 62 and 62' and the base 30 are respectively formed of electrically conductive material, drive power sources 16 and 16' are connected between the elastic bodies 62, 62' and the base 30, so as to drive the first displacement element 60 and the second displacement element 60' at the previously described resonance frequency.

Displacement can be magnified by resonating the elastic bodies 62 and 62' using the piezoelectric elements 61 and 61' as the oscillation source. Displacement is greater because of the small attenuation of the metal material, and it is possible to prevent damage to the piezoelectric elements 61 and 61' by reducing the tension force added to the piezoelectric elements 61 and 61'. Aluminum, titanium, iron, copper and alloys thereof may be used as the material for the elastic bodies 62 and 62'. The proportion of the entire displacement element of the single layer piezoelectric elements 61 and 61' is extremely small in the length direction.

Although two displacement elements 10 and 10' or 60 and 60' are arranged so as to intersect in order to drive the tip 20 in the description of the present embodiment, the present invention is not limited to this arrangement inasmuch as these displacement elements also may be arranged at other optional angles, e.g., 45°, 135° and the like. Furthermore, the number of displacement elements is not limited to two, inasmuch as three or more displacement elements may be used, so as to drive the displacement elements with three or four degrees of freedom. The drive source of the displacement element need not be only a piezoelectric element, since other electrical or mechanical displacement elements may be used, such as a magnetostrictive element and the like.

As described above, the present invention drives a displacement element when the tip member is on contact with the rotor, and near conditions of transition from an intermittent contact state to a normal contact state.

When the drive member (e.g., tip member 20) and the driven member (e.g., rotor 40) are in a state of intermittent in contact, the friction force acting between the drive member and the driven member increases in conjunction with increase in compression force by the compression member (e.g., spring 41), thereby increasing the starting force (acceleration) of the actuator. Furthermore, the time of contact between the drive member and the driven member lengthens in conjunction with the increase in the compression force by the compression member. Since the increase in acceleration is greater than the deceleration during contact between the drive member and the driven member, the actuator output is increased.

On the other hand, when the drive member and the driven member are in a state of normal contact, the friction force acting between the drive member and the driven member increase in conjunction with the increase in compression force by the compression member, so as to produce an increase in the starting force of the actuator, but the deceleration force also increases simultaneously. When the voltage of the drive signal is fixed, the amplitude of the displacement of the displacement element is constant, and the difference between acceleration force and deceleration force (equivalent to torque) is nearly constant. Since the speed is reduced when the compression force of the compression member increases, there is a resulting reduction in the output of the actuator.

Accordingly, the actuator drive efficiency can be maximized and the actuator output can be simultaneously maximized by driving the displacement element such that the drive member and driven member are in a state of intermittent contact, and in a state near the condition of transition from the intermittent contact state to the normal contact state.

When the spring constant of the compression member is designated $k1$, the spring constant of the displacement member is designated $k2$, the spring constant of the combined drive member and driven member is designated $k3$, the amount of displacement of the displacement element is designated $X0$, and the compression force of the compression member is designated $Nt$, the actuator can be driven under critical conditions by satisfying the relationship below.

$$Nt = X0(1/(1/k2+1/k3) - 1/(1/k1+1/k2+1/k3))$$

The amount of displacement $X0$ of the displacement element can be increased without increasing the drive voltage of the displacement element by driving the displacement element at a resonance frequency.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An actuator for moving a driven member, said actuator comprising:
   a displacement element for producing a specific displacement;
   a drive member connected to one end of said displacement element and which transfers the displacement of said displacement element to a driven member;
   a stationary member which supports the other end of the displacement element;
   a compression member for pressing said drive member against the driven member such that the drive member and the driven member are in a state of intermittent contact, and under conditions near a condition of transition from the intermittent contact state to a normal contact state; and
   a drive circuit for driving said displacement element.

2. An actuator as claimed in claim 1, wherein a following relationship is satisfied:

$$Nt = X0(1(1/k2+1/k3) - 1/(1/k1+1/k2+1/k3))$$

when a spring constant of the compression member is designated $k1$, a combined spring constant of the displacement element and the drive member is designated $k2$, a spring constant of the driven member is designated $k3$, an amount of displacement of the displacement element is designated $X0$, and a compression force applied by the compression member is designated $Nt$.

3. An actuator as claimed in claim 2, wherein said drive circuit drives said displacement element at a resonance frequency.

4. An actuator as claimed in claim 1, wherein said drive circuit drives said displacement element at a resonance frequency.

5. An actuator as claimed in claim 1, wherein said displacement element is a laminate type piezoelectric element.

6. An actuator as claimed in claim 5, wherein said displacement element includes alternating layers of a plurality of piezoelectric thin plates and electrodes.

7. An actuator for moving a driven member, said actuator comprising:
   a first displacement element for producing a first specific displacement;
   a second displacement element for producing a second specific displacement having a direction which has a predetermined angle to a direction of the first specific displacement of said first displacement element;
   a drive member connected to one end of each of said first and second displacement elements and which transfers the displacement of said first and second displacement elements to a driven member;
   a stationary member which supports the other end of each of the first and second displacement elements;
   a compression member for pressing said drive member against the driven member such that the drive member and the driven member are in a state of intermittent contact, and under conditions near a condition of transition from the intermittent contact state to a normal contact state; and
   a drive circuit for driving said first and second displacement elements.

8. An actuator as claimed in claim 7, wherein a following relationship is satisfied:

$$Nt = X0(1/(1/k2+1/k3) - 1/(1/k1+1/k2+1/k3))$$

when a spring constant of the compression member is designated $k1$, a combined spring constant of the first and second displacement elements and the drive member is designated $k2$, a spring constant of the driven member is designated $k3$, an amount of displacement of the first and second displacement elements is designated $X0$, and a compression force applied by the compression member is designated $Nt$.

9. An actuator as claimed in claim 8, wherein said drive circuit drives said first and second displacement elements at a resonance frequency.

10. An actuator as claimed in claim 7, wherein said drive circuit drives said first and second displacement elements at a resonance frequency.

11. An actuator as claimed in claim 7, wherein each of said first and second displacement elements is a laminate-type piezoelectric element.

12. An actuator as claimed in claim 11, wherein each of said first and second displacement elements includes alternating layers of a plurality of piezoelectric thin plates and electrodes.

* * * * *

UNITED STATES PATENT AND TRADEMARK OFFICE
CERTIFICATE OF CORRECTION

PATENT NO. : 6,771,004 B1
DATED : August 3, 2004
INVENTOR(S) : Shinya Matsuda et al.

Figure 15:
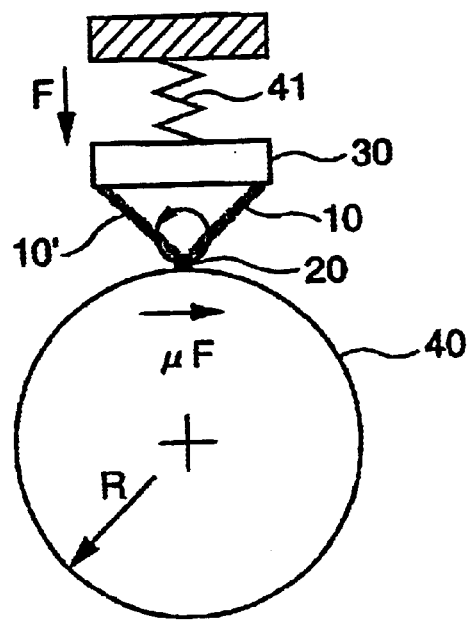
FIG. 15 shows the voltages applied to the two piezoelectric elements of the actuator, and the displacement resulting therefrom.
Figure 16:
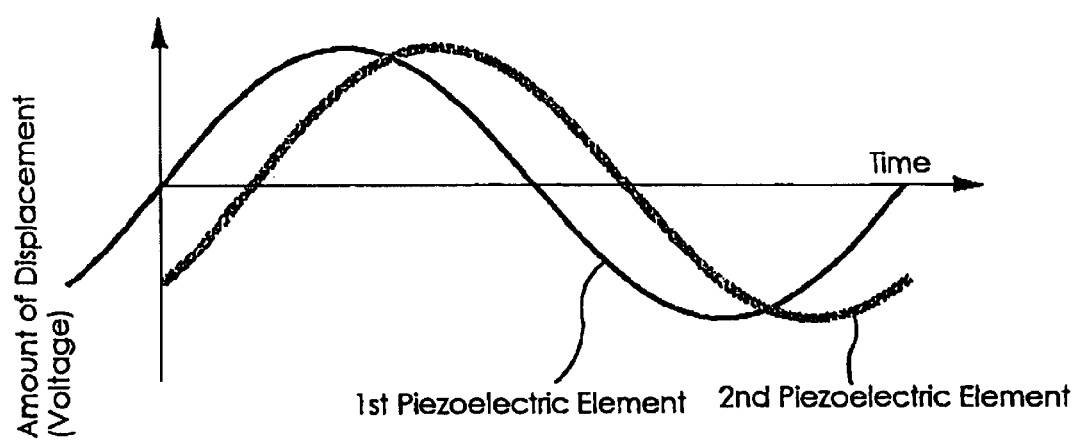
FIG. 16 shows a voltage applied to the first piezoelectric element and the second piezoelectric element.

It is certified that error appears in the above-identified patent and that said Letters Patent is hereby corrected as shown below:

Column 1,
Line 24, after "truss-type actuator." Begin a new paragraph and insert the following:
-- The operating principle of the general truss-type actuator is described below with reference to FIG. 15. FIG. 15 shows a truss-type actuator pressed against a rotor (driven member) 40 with a specific pressure F via a spring 41. In FIG. 15, $\mu$ represents the friction coefficient. --.

Column 8,
Line 48, delete "12a-12d" and insert -- 12a~12d --.

Column 9,
Line 9, delete "ti N-N´=X0(1/(1/k2+1/k3)-/(1/k1+1/52+1/k3))", and insert
-- N-N´=X0(1/(1/k2+1/k3)-/(1/k1+1/52+1/k3)) --.
Line 23, delete "Nw=N´ -N " -X0/(1/k2+1/k3)", and insert
-- Nw=N´-N" =X0/(1/k2+1/k3) --.

Column 12,
Line 8, delete "(Nt=X0(1(1/k2+1/k3)-1/(1/k1+1/k2+1/k3))", and insert
-- (Nt=X0(1/(1/k2+1/k3)-1/(1/k1+1/k2+1/k3)) --.

Signed and Sealed this

Seventeenth Day of May, 2005

JON W. DUDAS
*Director of the United States Patent and Trademark Office*